(12) United States Patent
Ichisaka et al.

(10) Patent No.: US 8,343,899 B2
(45) Date of Patent: Jan. 1, 2013

(54) BEARING LUBRICATING OIL AND BEARING

(75) Inventors: Kotomasa Ichisaka, Osaka (JP); Masato Fujii, Osaka (JP)

(73) Assignee: Sato Special Oil Co., Ltd., Osaka (JP)

( * ) Notice: Subject to any disclaimer, the term of this patent is extended or adjusted under 35 U.S.C. 154(b) by 0 days.

(21) Appl. No.: 13/039,610

(22) Filed: Mar. 3, 2011

(65) Prior Publication Data

US 2012/0076449 A1 Mar. 29, 2012

(30) Foreign Application Priority Data

Sep. 24, 2010 (JP) .................. 2010-213789

(51) Int. Cl.
 C10M 105/32 (2006.01)
 C10M 105/34 (2006.01)
 F16C 32/06 (2006.01)
(52) U.S. Cl. ....................... 508/463; 384/100
(58) Field of Classification Search .......... 508/463, 508/485, 495, 532; 384/100
See application file for complete search history.

(56) References Cited

U.S. PATENT DOCUMENTS

| | | | | |
|---|---|---|---|---|
| 4,772,522 | A * | 9/1988 | Kubota et al. ............ | 428/328 |
| 2007/0191240 | A1 * | 8/2007 | Suda ....................... | 508/485 |
| 2008/0026967 | A1 * | 1/2008 | Suda et al. .............. | 508/459 |
| 2008/0211333 | A1 | 9/2008 | Khan et al. | |
| 2009/0318317 | A1 | 12/2009 | Morishima | |
| 2010/0035773 | A1 * | 2/2010 | Hirata et al. ........... | 508/100 |

FOREIGN PATENT DOCUMENTS

| | | |
|---|---|---|
| JP | 2000-063860 | 2/2000 |
| JP | 2001-279284 | 10/2001 |
| JP | 2001-316687 | 11/2001 |
| JP | 2002-146374 | 5/2002 |
| JP | 2004-091524 | 3/2004 |
| JP | 2004-250625 | 9/2004 |
| JP | 2005-154726 | 6/2005 |
| JP | 2006-096849 | 4/2006 |
| JP | 2007-186710 | 7/2007 |
| JP | 2008-001886 | 1/2008 |
| JP | 2008-063385 | 3/2008 |
| JP | 2008-133339 | 6/2008 |
| JP | 2008-179773 | 8/2008 |
| JP | 2008-280540 | 11/2008 |
| JP | 2009-035705 | 2/2009 |
| JP | 2009-203275 | 9/2009 |
| JP | 2010-180331 | 8/2010 |

* cited by examiner

*Primary Examiner* — Ellen McAvoy
*Assistant Examiner* — Vishal Vasisth
(74) *Attorney, Agent, or Firm* — Young & Thompson

(57) ABSTRACT

A bearing oil contains a first monoester which is an ester of a branched chain fatty acid containing 18 carbon atoms or a monounsaturated fatty acid containing 18 carbon atoms and ethylhexyl alcohol.

12 Claims, 2 Drawing Sheets

BEARING LUBRICATING OIL AND BEARING

CROSS-REFERENCE TO RELATED APPLICATION

This application claims priority to Japanese Patent Application No. 2010-213789 filed on Sep. 24, 2010, the disclosure of which including the specification, the drawings, and the claims is hereby incorporated by reference in its entirety.

BACKGROUND

The present disclosure relates to bearing lubricating oils and bearings, and more particularly, to monoester lubricating oils used for fluid bearings, etc., and bearings using the same.

With the recent trend toward reducing the power consumption of audio devices, personal computers, etc. as well as downsizing, a hard disk drive etc. which are included in these devices are required to stop the motor in the standby state and rotate the motor only during access operation so as to reduce the power consumption. When the motor is frequently stopped and started, it is important to reduce the torque of the motor during start to reduce the power consumption. In order to achieve this, there is a need for a bearing lubricating oil (bearing oil) having low viscosity. Also, in order to allow the use of the hard disk drive etc. in cold climates, there is a need for a bearing oil with excellent low-temperature fluidity which does not solidify at as low as −40° C. On the other hand, the hard disk drive is required to operate at a temperature of about 50-60° C. In this use environment, the temperature of the bearing oil is likely to increase up to about 90° C. The temperature increase may induce a significant reduction in the viscosity of the bearing oil, leading to a reduction in bearing stiffness, so that the bearing does not work. Therefore, bearing oils for motors of hard disk drives etc. need not only to have low viscosity at low temperature, but also to keep the viscosity higher than a predetermined level at high temperature. Such bearing oils are required to have a high viscosity index, i.e., the viscosity decreases less with an increase in temperature.

Conventional bearing oils contain the following components: a diester, such as dioctyl sebacate; a polyolester composed of a polyol, such as trimethylolpropane etc., and a straight chain fatty acid containing from 4 to 8 carbon atoms; etc. Conventional bearing oils have, however, failed to satisfy characteristics which are recently required by hard disk drive motors etc. Therefore, a bearing oil containing a mixture of a plurality of diesters etc., a bearing oil containing a special diester etc., and the like are being studied (see, for example, Japanese Patent Publication Nos. 2004-91524 and 2005-154726).

SUMMARY

However, conventional bearing oils containing a diester, a polyolester, etc. cannot satisfy all conditions for a satisfactory pour point, viscosity at low temperature, and viscosity at high temperature in a balanced manner.

The present disclosure describes implementations of a bearing oil which ensures fluidity at −40° C., and has low viscosity at low temperature and a small decrease in viscosity with an increase in temperature.

An example bearing oil contains a first monoester which is an ester of a branched chain fatty acid containing 18 carbon atoms or a monounsaturated fatty acid containing 18 carbon atoms and ethylhexyl alcohol.

The bearing oil has a pour point of −40° C. or less, low kinematic viscosity of low temperature, and a high viscosity index. Therefore, it is possible to provide a motor which can be used within a wide range of from low temperature to high temperature.

The bearing oil may further contain a second monoester which is an ester of ethylhexanoic acid and a monohydric alcohol containing from 6 to 18 carbon atoms.

In the bearing oil, the mass ratio of the first monoester to the second monoester may be 60:40 to 85:15. With this arrangement, the bearing oil can have a kinematic viscosity of 190 mm$^2$/s or less at −20° C., and a viscosity index of 150 or more.

In the bearing oil, the first monoester may be ethylhexyl octadecenoate, and the second monoester may be octyldecyl ethylhexanoate.

The bearing oil may further contain an antioxidant.

The bearing oil may further contain a viscosity modifier for modifying the viscosity of the bearing oil.

DETAILED DESCRIPTION

Figure 1:
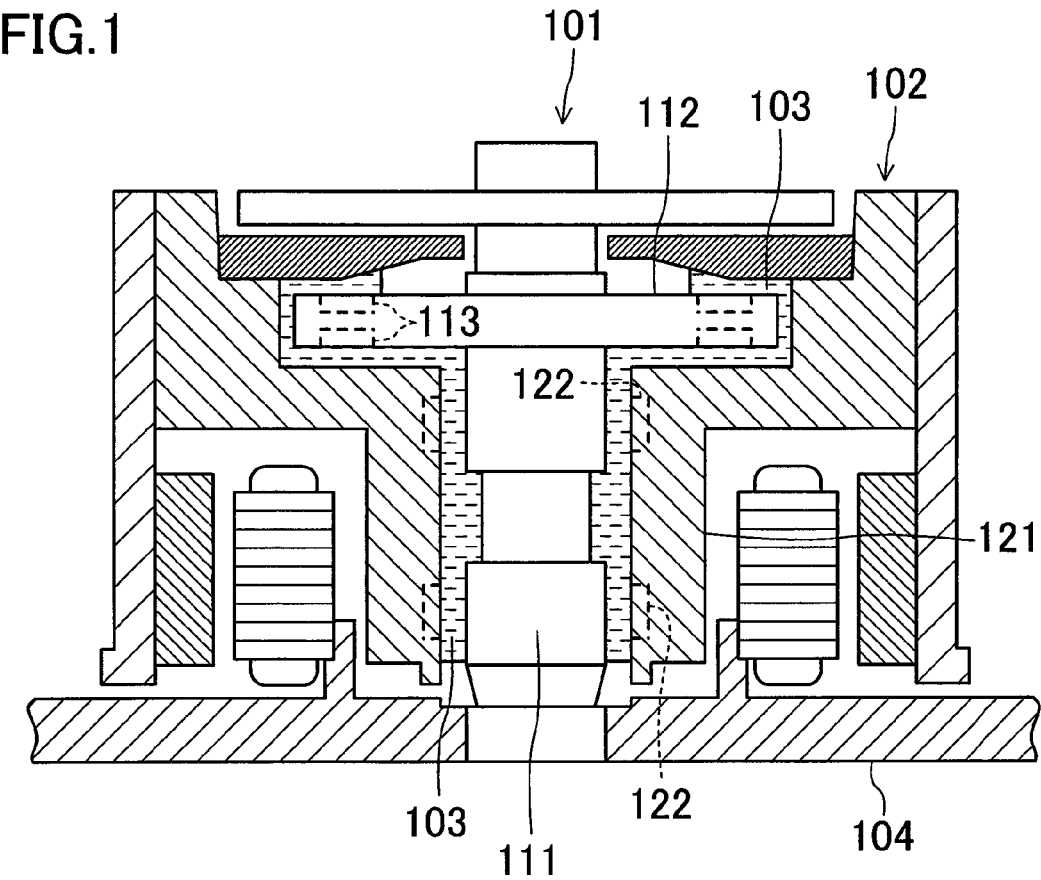
FIG. 1 is a cross-sectional view of an example fluid bearing.

FIG. 1 shows an example fluid bearing. A stator 101 includes a shaft 111 whose lower end portion is fixed to a base member 104, and a disc-shaped thrust plate 112 provided above the shaft 111, extending in the radial direction. A rotating sleeve 102 is rotatably engaged with the stator 101. A small gap between the stator 101 and the rotating sleeve 102 is filled with a bearing lubricating oil (bearing oil) 103 by capillary action. A pair of dynamic pressure generation grooves (e.g., herringbone grooves) 122 is formed on an internal circumferential surface of a sleeve portion 121 of the rotating sleeve 102 with the grooves being separated from each other in the axial direction. A pair of radial bearing portions is provided between the shaft 111 and the sleeve portion 121. A dynamic pressure generation groove 113 is also formed in each of an upper surface and a lower surface of the thrust plate 112. A pair of thrust bearing portions is provided between the thrust plate 112 and the rotating sleeve 102.

When the rotating sleeve 102 is rotated, the bearing oil 103 held between the rotating sleeve 102 and the stator 101 is pressed against the dynamic pressure generation grooves 122 and 113 along the groove patterns, so that high-pressure portions locally occur in the bearing oil 103. As a result, the pair of radial bearing portions can support the load of the rotating sleeve 102 in the radial direction, while the pair of thrust bearing portions can support the load of the rotating sleeve 102 in the thrust direction.

When the temperature of the bearing oil 103 is low, for example, during start of a motor, then if the viscosity of the bearing oil 103 is high, the viscous drag of the bearing oil 103 is great with respect to the dynamic pressure generation grooves 122 and 113 during rotation, so that the power loss of the motor is significant. On the other hand, when the temperature of the bearing oil 103 is high, for example, during continuous rotation of the rotating sleeve 102, the bearing oil 103 thermally expands, so that the viscosity decreases. In this case, the bearing stiffness decreases, so that the rotating sleeve 102 cannot be effectively supported. Therefore, the bearing oil 103 needs to have viscosity characteristics that the viscosity is low at low temperature and does not substantially decrease with an increase in temperature, i.e., a high viscosity index. The viscosity characteristics may seem to be contradictory.

The present inventors have found that a combination of specific fatty acid monoesters can be used to provide a bearing lubricating oil (bearing oil) having low viscosity at low temperature and a high viscosity index. Specifically, a mixture of a first monoester which is an ester of a fatty acid containing 18 carbon atoms and ethylhexyl alcohol and a second monoester which is an ester of ethylhexanoic acid and a monohydric alcohol containing from 8 to 18 carbon atoms, is used as a base oil for a bearing oil, whereby the bearing oil can have excellent characteristics.

Examples of the fatty acid containing 18 carbon atoms includes stearic acid, which is a straight chain saturated fatty acid, octyldecanoic acid (isostearic acid), heptylundecanoic acid, hexyldodecanoic acid, pentyltridecanoic acid, butyltetradecanoic acid, propylpentadecanoic acid, ethylhexadecanoic acid, and methylheptadecanoic acid, which are branched chain fatty acids, octadecenoic acid, which is a straight chain monounsaturated fatty acid, etc. The position of branching is preferably the 2-position or may be other positions. The position of an unsaturated bond is preferably the 9-position (e.g., oleic acid) or may be other positions. The fatty acid containing 18 carbon atoms may be a cis- or trans-isomer, or a mixture of such isomers.

The ethylhexyl alcohol is preferably branched at the 2-position or may be branched at other positions.

The ethylhexanoic acid is preferably branched at the 2-position or may be branched at other positions.

The monohydric alcohol containing from 8 to 18 carbon atoms may be a straight chain alcohol or a branched chain alcohol. In the case of the branched chain alcohol, the monohydric alcohol containing from 8 to 18 carbon atoms is preferably branched at the 2-position or may be branched at other positions. A monohydric alcohol containing 18 carbon atoms is particularly preferable. Specifically, preferable are straight chain octadecanol (stearyl alcohol), branched chain octyldecanol (isostearyl alcohol), heptylundecanol, hexyldodecanol, pentyltridecanol, propylpentadecanol, ethylhexadecanol, and methylheptadecanol. Octadecenol, which is an unsaturated monohydric alcohol, etc. may be used.

The mass ratio of the first monoester to the second monoester in the base oil is preferably about 40:60 to about 85:15. Note that only the first monoester may be used without being mixed with the second monoester under some conditions in use.

The bearing oil having such a composition can have a pour point of −40° C. or less, a kinematic viscosity of 180 mm$^2$/s at −20° C., and a kinematic viscosity of 2.5 mm$^2$/s or more and 3.0 mm$^2$/s or less at 100° C.

The bearing oil of this embodiment may contain a viscosity modifier in addition to the first and second monoesters. Examples of the viscosity modifier include dioctyl sebacate, dioctyl azelate, dioctyl adipate, etc., which are diesters. The amount of the viscosity modifier added may be determined, depending on the required viscosity. If an excessively large amount of the viscosity modifier is added, the pour point may increase or the change of viscosity with temperature (viscosity index) may increase. Therefore, the mass ratio of the base oil to the viscosity modifier is preferably about 80:20 to about 90:10.

The bearing oil of this embodiment may further contain various additives. Examples of the additives include metal deactivators, antioxidants, extreme pressure additives, polymerization stabilizers, anticorrosives, property stabilizers, etc.

Examples of the metal deactivators include benzotriazole-based compounds, thiadiazole-based compounds, gallic acid ester-based compounds, etc. These metal deactivators may be used singly or in combination. The amount of the metal deactivator added to the bearing oil may be about 0.05 mass % to about 0.5 mass % of the total mass of the bearing oil.

Examples of the antioxidants include phenolic or amine compounds. Specifically, examples of the phenolic compounds include 2,6-di-t-butylphenol, 4,4'-methylenebis(2,6-di-t-butylphenol)', 4,4'-bis(2,6-di-tert-butylphenol), 4,4'-bis(2-methyl-6-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(3-methyl-6-tert-butylphenol), tetrakis-(methylene-3-(3',5'-di-tert-butyl-4'hydroxphenyl)propionate)methane, etc. Examples of the amine compounds include monoalkyldiphenylamines, dialkyldiphenylamines, polyalkyldiphenylamines, and naphthylamines. Specifically, monooctyldiphenylamine, mononyldiphenylamine, 4,4'-dibutyldiphenylamine, 4,4'-dipentyldiphenylamine, 4,4'-dihexyldiphenylamine, 4,4'-dibutyldiphenylamine, 4,4'-dioctyldiphenylamine, 4,4'-bis(4-α,α-dimethylbenzyl)diphenyl amine, etc. may be used. These antioxidants may be used singly or in combination. The amount of the antioxidant added to the bearing oil may be about 0.01 mass % to about 5 mass % of the total mass of the bearing oil.

Examples of the extreme pressure additives include phosphoric esters, phosphorous esters, etc. Specific examples of the phosphoric esters include tricresyl phosphate, trioctyl phosphate, triphenyl phosphate, diphenyl hydrogen phosphate, etc. Examples of the phosphorous esters include tris(tridecyl)phosphite, dioleyl hydrogen phosphite, trinonyl phosphite, etc. By adding the phosphoric ester or the phosphorous ester to the bearing oil in an amount of about 0.05 mass % to about 1.0 mass % of the total mass of the bearing oil, the anti-wear properties of the bearing oil for iron-based metals can be significantly improved. These extreme pressure additives may be used singly or in combination.

Examples of the polymerization stabilizers include 2-phenylimidazole, 2-undecylimidazole, N,N'-carbonylimidazole, etc. These polymerization stabilizers may be used singly or in combination. The amount of the polymerization stabilizer added to the bearing oil may be about 0.05 mass % to about 0.5 mass % of the total mass of the bearing oil.

Examples of the anticorrosives or the property stabilizers include barium sulfonate, calcium sulfonate, phenate compounds, etc. These anticorrosives or property stabilizers may be used singly or in combination. The amount of the anticorrosive or the property stabilizer added to the bearing oil may be about 0.05 mass % to about 0.5 mass % of the total mass of the bearing oil.

Evaluation Method

The kinematic viscosity was measured at −20° C., 40° C., and 100° C. in accordance with the Japanese industrial standards (JIS) K-2283. The viscosity index was calculated in accordance with the method B of JIS-K-2283.

The pour point was measured in accordance with JIS-K-2269.

The total acid number was measured in accordance with JIS-K2501.

An accelerated test was conducted as follows: samples placed on a stainless-steel petri dish having a diameter of 58 mm were maintained at 120° C. for 1,000 hours. After the process, the samples were measured in terms of the rate of change in the kinematic viscosity and the rate of change in the total acid number. The kinematic viscosity change rate was obtained by dividing the difference in kinematic viscosity (40° C.) between before and after the process by the kinematic viscosity before the process. The difference in total acid number between before and after the process was defined as the total acid number change rate.

First Example

The base oil was ethylhexyl oleate (ethylhexyl octadecenoate), which is the first monoester. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

Second Example

The base oil was a mixture oil of the first and second monoesters. The first monoester was ethylhexyl oleate, and the second monoester was isostearyl ethylhexanoate (octyldecyl ethylhexanoate). The molar ratio of the first monoester to the second monoester in the base oil was 80:20. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

Third Example

The base oil was a mixture oil of the first and second monoesters. The first monoester was ethylhexyl oleate, and the second monoester was isostearyl ethylhexanoate. The molar ratio of the first monoester to the second monoester in the base oil was 20:80. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

Fourth Example

The base oil was ethylhexyl oleate, which is the first monoester. Dioctyl sebacate was added as the viscosity modifier to the base oil. The molar ratio of the first monoester to the viscosity modifier in the base oil was 80:20. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

First Comparative Example

The base oil was isostearyl ethylhexanoate, which is the second monoester. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

Second Comparative Example

The base oil was neopentyl glycol dinonanoate. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

Third Comparative Example

The base oil was trimethylolpropane trihexanoate. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

Fourth Comparative Example

The base oil was 3-methyl-1,5-pentanediol dinonanoate. The phenolic antioxidant, the amine antioxidant, dioleyl hydrogen phosphite as the extreme pressure additive, a benzotriazole derivative as the metal deactivator, and an imidazole compound as the polymerization stabilizer were added to the bearing oil in an amount of 0.5 mass %, 0.5 mass %, 0.5 mass %, 0.1 mass %, and 0.1 mass %, respectively, of the total mass of the bearing oil.

TABLE 1

| | Base oil | Viscosity modifier | Kinematic viscosity ($mm^2/s$) −20° C. | 40° C. | 100° C. | Pour point (° C.) |
|---|---|---|---|---|---|---|
| Ex. 1 | C18 ester (100%) | — | 118.3 | 8.47 | 2.76 | −40 |
| Ex. 2 | C18 ester (80%)/ethylhexanoic acid ester (20%) | — | 130.5 | 8.78 | 2.7 | −45 |
| Ex. 3 | C18 ester (20%)/ethylhexanoic acid ester (80%) | — | 175.9 | 9.31 | 2.63 | −60 |
| Ex. 4 | C18 ester (100%) | 20% | 162.5 | 9.56 | 2.89 | −55 |
| Com. 1 | Ethylhexanoic acid ester (100%) | — | 198.8 | 9.49 | 2.58 | −45 |

TABLE 1-continued

| | | Kinematic viscosity (mm²/s) | | | Pour point |
|---|---|---|---|---|---|
| Base oil | Viscosity modifier | −20° C. | 40° C. | 100° C. | (° C.) |
| Com. 2 | Neopentyl glycol dinonanoate | — | 152.1 | 8.63 | 2.56 | −32.5 |
| Com. 3 | Trimethylolpropane trihexanoate | — | 276.8 | 11.3 | 3.12 | −65 |
| Com. 4 | 3-methyl-1,5-pentanediol dinonanoate | — | 138.9 | 9.11 | 2.8 | −32.5 |

*) Ex. is the abbreviation of Example, and Com. is the abbreviation of Comparative Example.

Table 1 shows kinematic viscosities and pour points of the above examples and comparative examples. As shown in Table 1, the base oil which contained the first monoester singly or a mixture of the first and second monoesters had a considerably low viscosity of 180 mm²/s or less at −20° C., a kinematic viscosity of about 2.6 mm²/s to about 2.9 mm²/s at 100° C., and a pour point of −40° C. or less.

On the other hand, the first comparative example had a kinematic viscosity of about 200 mm²/s at −20° C., and a kinematic viscosity of 2.6 mm²/s or less at 100° C. The second and fourth comparative examples had a kinematic viscosity of about 140 mm²/s to about 150 mm²/s at −20° C. and a pour point of −30° C. to −40° C., and therefore, did not have sufficient fluidity at low temperature. The third comparative example had a pour point of −65° C. and a kinematic viscosity of about 280 mm²/s at −20° C., and therefore, did not have sufficient fluidity at low temperature.

Thus, the bearing oils of the above examples have fluidity at as low as −40° C., and low viscosity at low temperature, and also have viscosity which allows them to function as bearing oil at high temperature, and therefore, are useful for bearing oil.

Figure 2:
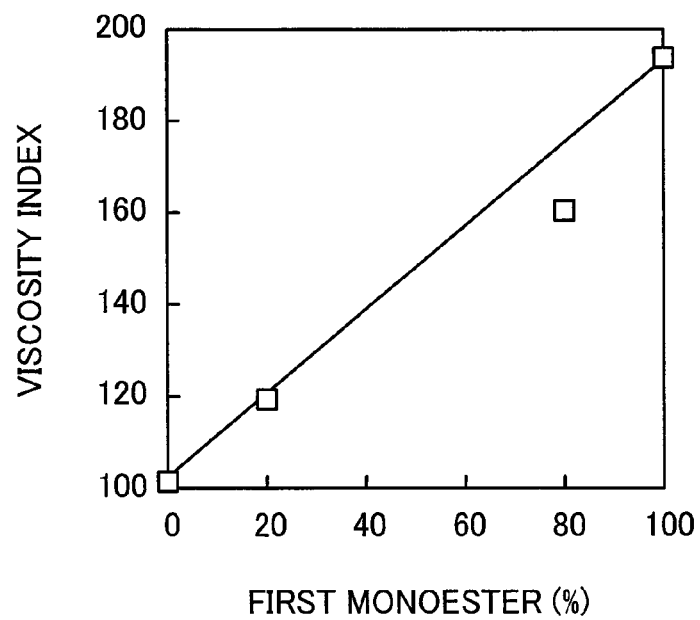
FIG. 2 is a graph showing the relationship between the mixture ratio of a first monoester to a second monoester in a base oil, and the viscosity index of the base oil.

FIG. 2 shows the relationship between the mixture ratio of the first monoester to the second monoester, and the viscosity index. The horizontal axis indicates the mass ratio of the first monoester to the base oil. When the mass ratio is 0%, the base oil contains the second monoester singly, and when the mass ratio is 100%, the base oil contains the first monoester singly. When the base oil contains the second monoester singly, the viscosity index is about 100. The viscosity index gradually increases as the mass ratio of the first monoester increases, i.e., the mass ratio of the second monoester decreases. When the base oil contains the first monoester singly, the viscosity index is 190 or more. Of the comparative examples, one in which the base oil was trimethylolpropane trihexanoate had the highest viscosity index whose value is 144. Thus, if the mass ratio of the first monoester to the base oil is 60% or more, a bearing oil which has a viscosity index much higher than those of conventional bearing oils containing a diester or a polyolester as the base oil, can be obtained.

Figure 3:
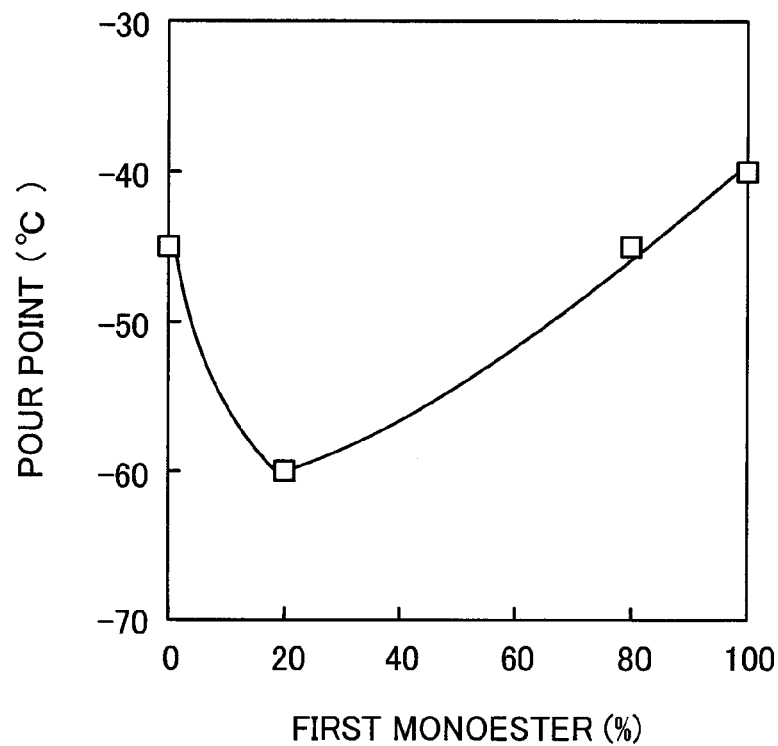
FIG. 3 is a graph showing the relationship between the mixture ratio of the first monoester to the second monoester in the base oil, and the pour point of the base oil.

FIG. 3 shows the relationship between the mixture ratio of the first monoester to the second monoester, and the pour point. As shown in FIG. 3, by mixing the first monoester and the second monoester, the pour point is caused to be lower than that when the second monoester is used singly. When the ratio of the first monoester is 20%, the pour point is −60° C. As the ratio of the first monoester increases, the pour point gradually increases. When the first monoester is used singly, the pour point is −40° C.

TABLE 2

| | Kinematic viscosity change rate (%) | Total acid number change rate (mgKOH/g) |
|---|---|---|
| Example 1 | 35 | 5.5 |
| Example 2 | 25 | 3.6 |
| Example 3 | 20 | 1.6 |
| Example 4 | 5 | 1.2 |
| Comparative Example 1 | 5 | 0.5 |
| Comparative Example 2 | 3 | 2.3 |
| Comparative Example 3 | 2 | 3.5 |
| Comparative Example 4 | 3.5 | 1.2 |

Figure 4:
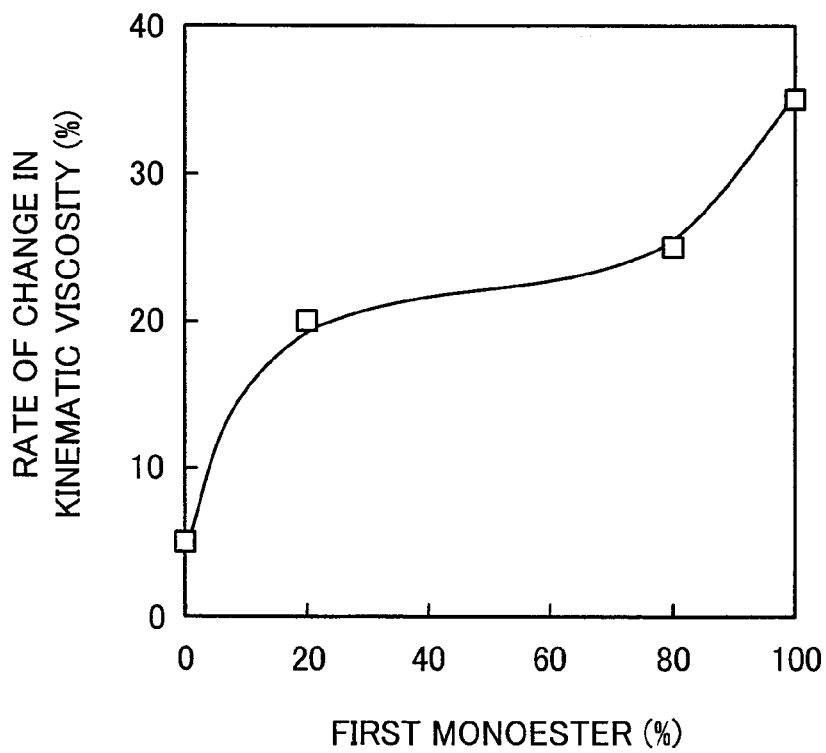
FIG. 4 is a graph showing the relationship between the mixture ratio of the first monoester to the second monoester in the base oil, and the kinematic viscosity of the base oil.

Table 2 shows results from the accelerated test of the above examples and comparative examples. As shown in Table 2, in both the examples and the comparative examples, sufficient kinematic viscosities and total acid numbers are observed after being maintained at 120° C. for 1,000 hours, indicating sufficient durability. FIG. 4 shows the relationship between the mixture ratio of the first monoester to the second monoester, and the rate of change in the kinematic viscosity. In order to cause the kinematic viscosity change rate to be 30% or less, the mass ratio of the first monoester to the base oil is preferably 85% or less.

The bearing oils described in the above examples each have a low pour point, low kinematic viscosity at low temperature, and a high viscosity index, and therefore, are applicable not only to bearing oils for fluid bearings, but also to bearing oils for impregnated metal bearings.

As described above, the bearing oil of the present disclosure ensures fluidity at −40° C., and has low viscosity at low temperature, and a small decrease in viscosity with an increase in temperature. The bearing oil of the present disclosure is particularly useful for fluid bearings for motors.

What is claimed is:

1. A bearing oil, comprising a base oil, wherein the base oil consists essentially of:
   a first monoester that is an ester of a branched chain fatty acid containing 18 carbon atoms or a monounsaturated fatty acid containing 18 carbon atoms and ethylhexyl alcohol; and
   a second monoester that is an ester of ethylhexanoic acid and a monohydric alcohol containing from 6 to 18 carbon atoms.

2. The bearing oil of claim 1, wherein a mass ratio of the first monoester to the second monoester is in a range of 60:40 to 85:15.

3. The bearing oil of claim 1, wherein the first monoester is ethylhexyl octadecenoate, and the second monoester is octyldecyl ethylhexanoate.

4. The bearing oil of claim 1, further comprising an antioxidant.

5. The bearing oil of claim 1, further comprising a viscosity modifier for modifying viscosity of the bearing oil.

6. A bearing device comprising:
   a stator;
   a rotating sleeve rotatably engaged with the stator; and
   a bearing oil comprising a base oil, the bearing oil filling a gap between the stator and the rotating sleeve,
   wherein the base oil consists essentially of:
   a first monoester that is an ester of a branched chain fatty acid containing 18 carbon atoms or a monounsaturated fatty acid containing 18 carbon atoms and ethylhexyl alcohol, and
   a second monoester that is an ester of ethylhexanoic acid and a monohydric alcohol containing from 6 to 18 carbon atoms.

7. The bearing device of claim 6, wherein a mass ratio of the first monoester to the second monoester is in a range of 60:40 to 85:15.

8. The bearing device of claim 6, wherein the first monoester is ethylhexyl octadecenoate, and the second monoester is octyldecyl ethylhexanoate.

9. The bearing device of claim 6, wherein the bearing oil further comprises an antioxidant.

10. The bearing device of claim 6, wherein the bearing oil further comprises a viscosity modifier for modifying viscosity of the bearing oil.

11. The bearing oil of claim 1, wherein the base oil has:
a pour point of −40° C. or less;
a kinematic viscosity of 180 mm$^2$/sec at −20° C.; and
a kinematic viscosity of 2.5 mm$^2$/sec to 3.0 mm$^2$/sec at 100° C.

12. The bearing device of claim 6, wherein the base oil has:
a pour point of −40° C. or less;
a kinematic viscosity of 180 mm$^2$/sec at −20° C.; and
a kinematic viscosity of 2.5 mm$^2$/sec to 3.0 mm$^2$/sec at 100° C.

* * * * *